(12) United States Patent
Kuhmann et al.

(10) Patent No.: US 8,007,916 B2
(45) Date of Patent: Aug. 30, 2011

(54) PROCESS FOR PRODUCTION OF A COMPOSITE

(75) Inventors: Karl Kuhmann, Dülmen (DE); Klaus Hülsmann, Haltern am See (DE); Martin Wielpütz, Münster (DE); Walter-Konrad Mertens, Dorsten (DE); Ursula Schaub, Marl (DE); Kirsten Alting, Münster (DE); Simon Amesöder, Boxdorf (DE); Leo Hoffmann, Fürth (DE)

(73) Assignee: Evonik Degussa GmbH, Essen (DE)

( * ) Notice: Subject to any disclaimer, the term of this patent is extended or adjusted under 35 U.S.C. 154(b) by 1129 days.

(21) Appl. No.: 11/341,520

(22) Filed: Jan. 30, 2006

(65) Prior Publication Data

US 2006/0292387 A1    Dec. 28, 2006

(30) Foreign Application Priority Data

Jan. 28, 2005    (DE) .................. 10 2005 004 280

(51) Int. Cl.
 *B32B 27/06* (2006.01)
 *B32B 27/08* (2006.01)
 *B32B 27/16* (2006.01)
 *B32B 27/34* (2006.01)

(52) U.S. Cl. ............ 428/474.9; 427/535; 427/536; 427/539; 427/569; 428/412; 428/474.4; 428/475.2; 428/476.3

(58) Field of Classification Search .......... 427/447, 427/535, 536, 539, 569; 428/35.7, 36.8, 428/36.9, 36.91, 474.4, 474.7, 474.9, 475.2, 428/476.3, 412

See application file for complete search history.

(56) References Cited

U.S. PATENT DOCUMENTS

| | | | |
|---|---|---|---|
| 4,664,936 A * | 5/1987 | Ueno et al. ............. | 427/538 |
| 4,680,228 A * | 7/1987 | Sharma ............. | 428/378 |
| 4,756,925 A * | 7/1988 | Furukawa et al. ............. | 427/525 |
| 5,443,098 A | 8/1995 | Kertesz | |
| 5,576,101 A * | 11/1996 | Saitoh et al. ............. | 428/332 |
| 5,780,132 A | 7/1998 | Saitoh et al. | |
| 5,837,958 A * | 11/1998 | Fornsel ............. | 219/121.5 |
| 5,937,911 A * | 8/1999 | Kodama et al. ............. | 138/137 |
| 6,161,879 A | 12/2000 | Ries et al. | |
| 6,265,690 B1 | 7/2001 | Foernsel et al. | |
| 6,419,995 B1 * | 7/2002 | Kuckertz et al. ............. | 427/536 |
| RE38,087 E * | 4/2003 | Yokoe et al. ............. | 428/36.91 |
| 6,581,643 B2 * | 6/2003 | Guippe et al. ............. | 138/137 |
| 6,800,336 B1 | 10/2004 | Foernsel et al. | |
| 2002/0179575 A1 | 12/2002 | Foernsel et al. | |
| 2003/0124281 A1 | 7/2003 | Ries et al. | |
| 2004/0140668 A1 | 7/2004 | Monsheimer et al. | |
| 2004/0231591 A1 | 11/2004 | Jacobsen et al. | |
| 2005/0275141 A1 | 12/2005 | Lange | |
| 2006/0070677 A1 * | 4/2006 | Inoue et al. ............. | 138/109 |
| 2008/0036118 A1 * | 2/2008 | Prigandt et al. ............. | 264/483 |

FOREIGN PATENT DOCUMENTS

| | | |
|---|---|---|
| DE | 42 39 909 C1 | 5/1994 |
| DE | 195 35 413 C1 | 10/1996 |
| DE | 101 46 295 A1 | 4/2003 |
| DE | 103 08 989 A1 | 9/2004 |
| DE | 10 2004 024061 * | 12/2005 |
| DE | 102004047200 * | 4/2006 |
| EP | 0 761 415 A2 | 3/1997 |
| EP | 0 836 044 A1 | 4/1998 |
| EP | 896992 A1 * | 2/1999 |
| EP | 1 241 229 A1 | 9/2002 |
| EP | 1 323 973 A2 | 7/2003 |
| EP | 1 403 030 A1 | 3/2004 |
| WO | WO 99/52333 | 10/1999 |
| WO | WO 01/32949 A1 | 5/2001 |
| WO | WO 01/43512 A1 | 6/2001 |
| WO | WO 2004/076155 A1 | 9/2004 |
| WO | WO 2004/103680 A1 | 12/2004 |
| WO | WO 2005/111122 A1 | 11/2005 |

OTHER PUBLICATIONS

Machine translation of Hongo et al. JP 2000-318104. Published Nov. 21, 2000.*
Machine translation of Ishibashi. JP 2003-266626. Published Sep. 24, 2003.*
Machine translation of Riecke et al. (DE 10 2004 024061) (2005).*
Machine translation of Ziegler et al. (DE102004047200) (2006).*
Plasmatreat website page describing Openair® related patents. Retrieved on Apr. 1, 2008.*
Merriam Webster Online Dictionary. Entry for "sheet". Retrieved on Apr. 9, 2008.*
Simon Amesoeder, et al., "Plasma sorgt fuer festen Verbund", Kunststoffe, vol. 93, No. 9, 2003, pp. 124-129.
Simon Amesoeder, et al., "In-Line Activation with Atmospheric-Plasma Makes a Strong Bond in Mulit-Component Injection Moulding", ANTEC 2004, pp. 561-565.

* cited by examiner

*Primary Examiner* — Callie E Shosho
*Assistant Examiner* — John Freeman
(74) *Attorney, Agent, or Firm* — Oblon, Spivak, McClelland, Maier & Neustadt, L.L.P.

(57) ABSTRACT

A composite part is produced by a process in which at least one of components a) and b) of said composite part is treated with an Openair plasma on a contact surface between said components a) and b) prior to production of the composite part, followed by molding-on of the other component; wherein said components are as follows: a) a part which entirely or to some extent comprises a molding composition comprising at least 40% by weight of a polyamide whose monomer units contain an average of at least 8 carbon atoms, and b) a part comprising another molding composition.

20 Claims, No Drawings

PROCESS FOR PRODUCTION OF A COMPOSITE

BACKGROUND OF THE INVENTION

1. Field of the Invention

The present invention relates to a process for production of a composite part which comprises a component comprising a molding composition based on a higher polyamide.

2. Description of the Related Art

Higher polyamides, in particular those whose monomer units contain an average of at least 8 carbon atoms, have a property profile comprising by way of example impact resistance, low water absorption, chemicals resistance, alcohol resistance, engine-fuel resistance, and solvent resistance. This gives them good suitability for surfaces exposed to environmental effects such as atmospheric moisture or road salt, or exposure to engine fuels, oils, greases, or mixtures with alcohols. Component parts which have to perform a variety of functions are often composed of two or more layers or, respectively, two or more parts, these having been bonded to one another at a bonding surface. The properties of higher polyamide materials often make it advantageous here to form at least one of the layers or, respectively, one of the parts from a molding composition based on a higher polyamide. Typical examples here are items decorated by means of a film or elements of a system that conveys engine fuel or that conveys oil. Component parts of this type are known. For their production, either mutually compatible molding compositions are selected or an adhesion promoter is used. Because the vast majority of plastics are mutually incompatible and therefore do not adhere to one another, an adhesion promoter is mostly used in practice and is usually introduced in the form of a layer. The component part therefore comprises an additional component which in many instances contributes little to the application-related properties demanded from the component part and moreover complicates the production process; by way of example, in the case of the coextrusion process the result here is a requirement for an additional extruder. In the case of multicomponent injection molding, additional injection units are used for each of the components, in combination with mold technology which is often relatively complicated (core-back molds, rotating molds, and indexing plate molds). It would therefore be desirable to obtain successful adhesive bonding between a part comprising a molding composition based on a higher polyamide and a part comprising any desired other molding composition, without any need to use an adhesion promoter.

Current alternative industrial approaches to the problem of chemically/thermodynamically incompatible combinations of materials are based on interlocks, for example undercuts and perforations, or are materials-based, an example being adhesion-modification, or use surface processes such as priming with an adhesion promoter, if appropriate in solution, flame treatment, corona treatment, or low-pressure plasma treatment. However, these solutions are often associated with additional handling cost or increased materials costs. Furthermore, they often do not permit locally limited and flexible surface treatment. Further restrictions become apparent with the bonding of large areas or with processability when by way of example two different materials are processed in the same mold system with different respective ideal mold temperatures.

SUMMARY OF THE INVENTION

It is therefore an object of the present invention to provide composite parts which comprise a component comprising a molding composition based on a higher polyamide without concomitant use of any adhesion promoter and with elimination of the abovementioned disadvantages, in a manner sufficiently simple as to minimize the need for intervention in the manufacturing sequence.

This and other objects have been achieved by the present invention the first embodiment of which includes a process for production of a composite part, comprising:

treating at least one of components a) and b) of said composite part with an Openair plasma on a contact surface between said components a) and b) prior to production of the composite, followed by molding-on of the other component;

wherein said components are as follows:

a) a part which entirely or to some extent comprises a molding composition comprising at least 40% by weight of a polyamide whose monomer units contain an average of at least 8 carbon atoms, and b) a part comprising another molding composition.

The present invention further provides the composite part produced by the above process and various applications of such composite part.

DETAILED DESCRIPTION OF THE INVENTION

The present invention provides a process for production of a composite part which comprises the following components:

a) a part which entirely or to some extent comprises a molding composition which comprises at least 40% by weight, preferably at least 50% by weight, particularly preferably at least 60% by weight, with particular preference at least 70% by weight, and very particularly preferably at least 80% by weight or at least 90% by weight, of a polyamide whose monomer units contain an average of at least 8, at least 9, at least 10, or at least 11, carbon atoms, and also b) a part comprising another molding composition, the process comprising treatment of at least one of the components a) and b) on the contact surface of said components prior to production of the composite with an Openair plasma, followed by molding-on of the other component.

The amount of polyamide a) includes all values and subvalues therebetween, especially including 45, 50, 55, 60, 65, 70, 75, 80, 85, 90, 95, 98 and 99% by weight.

The present invention also provides the composite parts produced by this process.

The parts a) and b) are moldings (e.g. injection molding, extrudate, compression molding) or semifinished products (e.g. single- or multilayer films, textile structures, etc.).

Examples of suitable polyamides of the part a) are PA610, PA612, PA613, PA6,3T, PA810, PA812, PA1010, PA1012, PA1, PA12, PA1212 and PA PACM12. Instead of these homopolyamides, it is also possible to use polyetheresteramides, polyetheramides, or copolyamides based thereon. The polyamides may be used alone or in combination.

Alongside the polyamide, additives selected from the following can also be present in the molding composition:

impact modifiers conventional for polyamides, examples being ethylene-α-olefin copolymers (in particular EPM and EPDM) or styrene-ethylene-butylene block copolymers (in particular SEBS), the impact modifier always bearing additional functional groups, e.g. anhydride, or else α-olefin-acrylate co- or terpolymers with an olefinically unsaturated anhydride, glycidyl acrylate, or glycidyl methacrylate as co- or tercomponent;

other polymers, for example another polyamide or copolyamide, a thermoplastic polyester, e.g. polyethylene terephthalate, polybutylene terephthalate, polypropylene terephthalate, polyethylene 2,6-naphthalate, polypropylene 2,6-naphthalate, polybutylene 2,6-naphthalate, a copolyester based thereon, a polyolefin, e.g. polypropylene, or a fluoropolymer;

fillers and pigments, such as carbon black, titanium dioxide, glass beads, hollow glass beads, talc, zinc sulfide, silicates, carbonates, or nanoparticles, e.g. exfoliated or intercalated phyllosilicates;

reinforcing materials, such as glass fibers, aramid fibers, whiskers, or nanotubes, e.g. based on carbon;

additions which give the molding composition antistatic properties or electrical conductivity, e.g. carbon fibers, graphite fibrils, metal fibers, e.g. fibers comprising stainless steel, metal powder, or conductive carbon black;

flame retardants, such as magnesium hydroxide, aluminum hydroxide, melamine cyanurate, phosphorus-containing flame retardants, brominated aromatic compounds, and also, by way of example, brominated polystyrene or brominated polycarbonate;

conventional auxiliaries and additives, e.g. plasticizers, waxes, antioxidants, UV stabilizers, or nucleating agents;

magnetic fillers, e.g. ceramic particles, ferrites, rare noble metals;

IR-absorbent additives, for example in order to permit welding after prior plasma activation.

The part a) can comprise an additional layer which has been adhesive-bonded to the molding composition based on the higher polyamide. Examples of suitable layer materials are molding compositions based on other polyamides, on polyesters, on functionalized polyolefins, or on styrene-maleic anhydride copolymers. The respective molding composition generally comprises at least 50% by weight of one or more polymers and at most 50% by weight of the conventional additives. The amount of polymers includes all values and subvalues therebetween, especially including 55, 60, 65, 70, 75, 80, 85, 90 and 95% by weight. The amount of conventional additive includes all values and subvalues therebetween, especially including 5, 10, 15, 20, 25, 30, 35, 40 and 45% by weight.

In one embodiment, the part b) comprises a molding composition based on any desired thermoplastic polymer, the molding composition generally comprises at least 40% by weight of one or more polymers and at most 60% by weight of the conventional additives. The amount of polymers includes all values and subvalues therebetween, especially including 45, 50, 55, 60, 65, 70, 75, 80, 85, 90 and 95% by weight. The amount of conventional additive includes all values and subvalues therebetween, especially including 5, 10, 15, 20, 25, 30, 35, 40, 45, 50 and 55% by weight.

Examples of suitable polymers are polyamides, such as PA6, PA66, or PA6/6T, polyolefins, such as polyethylene, polypropylene, or poly-1-butene, polyoxymethylene (POM), acrylonitrile-butadiene-styrene copolymers (ABS), polycarbonate (PC), PC/ABS blends, polyesters, such as polyethylene terephthalate, polypropylene terephthalate, polybutylene terephthalate, polyethylene 2,6-naphthalate, polypropylene 2,6-naphthalate, polybutylene 2,6-naphthalate, PMMA, polyphenylene sulfide (PPS), or a thermoplastic elastomer, or else a mixture thereof.

In another embodiment, the part b) comprises a preferably vulcanized compounded rubber material. Examples of suitable underlying rubbers are an EP(D)M rubber, an SB rubber (in the form of ESBR or SSBR), BR, NR, IR, IIR, CIIR, BIIR, NBR, CR, FPM, ACM, AEM or AECM, a styrene-containing block copolymer, and/or a polyalkenylene.

EP(D)M rubbers are rubbers prepared in a known manner via polymerization of a mixture comprising ethylene and propylene and, if appropriate, of a diene, in the presence of a Ziegler-Natta catalyst.

SB rubber can be either ESBR or SSBR, its styrene content being at most about 40 percent by weight. The content of styrene includes all values and subvalues therebetween, especially including 5, 10, 15, 20, 25, 30, 35 and 40% by weight.

ESBR is prepared in a known manner via polymerization in emulsion, whereas SSBR is prepared via polymerization in solution.

Butadiene rubber (BR) can be prepared in a known manner by way of example via polymerization with the aid of Li catalysts or of cocatalysts.

Natural rubber (NR) is usually used in the cis-1,4 configuration. However, for the purposes of this present invention the trans-1,4 configuration is also suitable.

Isoprene rubber (IR) can be used, irrespective of whether it has been prepared by way of example using Ti catalysts or using Li catalysts.

Isobutene-isoprene rubber (IIR) can be used as it stands or in halogenated form (CIIR or BIIR).

Nitrile rubber (NBR) is obtained via copolymerization of butadiene and acrylonitrile in ratios by weight of from about 52:48 to 82:18. It can, if appropriate, also have been hydrogenated. The ratio of butadiene and acrylonitrile includes all values and subvalues therebetween, especially including 55:45, 60:40, 65:35, 70:30, 75:25 and 80:20.

Chloroprene rubber (CR) is usually prepared via free-radical emulsion polymerization.

FPM is a copolymer comprising propene and tetrafluoroethylene and has particularly high chemicals resistance. ACM is an acrylate rubber; AEM and AECM are ethylene-acrylate rubbers.

Any of the known grades based on styrene-butadiene or styrene-isoprene can be used as styrene-containing block copolymer. Examples here are SB, SBS, and SIS, and also corresponding grades which contain a larger number of blocks. These copolymers can be linear or branched. The soft phase can moreover have been hydrogenated; corresponding block copolymers are also termed styrene-ethylene-butylene-styrene block copolymers (SEBS).

Polyalkenylenes are prepared via ring opening or ring expanding polymerization of cycloalkenes [see K. J. Ivin, T. Saegusa, "Ring-opening Polymerisation", Vol. 1, Elsevier Appl. Sci. Publishers, London, in particular pages 121-183 (1984)]. Among these, preference is given to polyoctenylenes (cf. A. Dräxler, Kautschuk+Gummi, Kunststoff 1981, pages 185-190). Polyoctenylenes with different contents of cis- and trans-double bonds are obtainable by methods known from the literature, as also are different molecular weights.

It is, of course, also possible for mixtures of different rubbers to be present in the compounded rubber material. The nature and amount of the other constituents, such as fillers, vulcanizing agents, plasticizers, and vulcanization activators, depend on the nature of the rubber and on the technical requirements of the application. For each 100 parts by weight of rubber the amounts generally used are from 0 to 300 parts by weight of fillers, from 1 to 10 parts by weight of vulcanizing agents, from 0 to 4 parts by weight of vulcanization activators, and from 0 to 200 parts by weight of plasticizers. The amount of filler includes all values and subvalues therebetween, especially including 10, 20, 30, 40, 50, 60, 70, 80, 90, 100, 110, 120, 130, 140, 150, 160, 170, 180, 190, 200, 210, 220, 230, 240, 250, 260, 270, 280 and 290 parts by weight. The amount of vulcanizing activator includes all values and subvalues therebetween, especially including 0.5, 1, 1.5, 2, 2.5, 3 and 3.5 parts by weight. The amount of vulcanizing agent includes all values and subvalues therebetween, especially including 2, 3 4, 5, 6, 7, 8 and 9 parts by weight. The amount of plasticizer includes all values and subvalues therebetween, especially including 10, 20, 30, 40, 50, 60, 70, 80, 90, 100, 110, 120, 130, 140, 150, 160, 170, 180 and 190 parts by weight.

The Openair process is an atmospheric plasma process for pretreatment of surfaces. A plasma is generated by means of high-voltage discharge in a closed plasma chamber. A stream of carrier material, for example a stream of compressed air, is used to convey the plasma in the form of a non-thermal, substantially potential-free plasma, onto the surface of the component part.

With apparatus that is widely used currently, the plasma jet can, as a function of the performance of the nozzle, achieve a length of up to 50 mm and a treatment width of up to 15 mm or more. The plasma source is moved with a velocity of from 6 to 900 m/min relative to the surface of the treatment material within a distance of from 10 to 40 mm, as required by the intensity of treatment. The velocity ncludes all values and subvalues therebetween, especially including 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580 and 590 m/min. The distance includes all values and subvalues therebetween, especially including 15, 20, 25, 30 and 35 mm. Further developments in process technology and plant technology may result in appropriate extension of these technical parameters.

Variable nozzle geometries and appropriately adapted traversed motion can be used to adapt the exposure to the plasma appropriately with respect to component part geometry and to material. By way of example, the plasma head can be guided by way of a 6-axle articulated-arm robot within a defined distance over the surface to be treated of the component part positioned in the tooling. It is therefore possible to pretreat inserted parts, e.g. films, as well as previously injection-molded or extruded preforms.

Because the time of exposure to the plasma jet is short, pretreatment can be non-aggressive, but nevertheless efficient. The high-energy particles of the plasma are the starting point for rapidly proceeding physicochemical processes on the surface, which lead to activation.

Suitable apparatus are described by way of example in EP 0 761 415 A2, WO 99/52333, and WO 01/43512.

Via suitable selection of the carrier gas it is possible to coat the surface simultaneously, and this can likewise improve adhesion to the other component. WO 01/32949 describes a suitable process for plasma coating.

DE 103 08 989 A1 describes a process for Openair plasma activation of a film surface and subsequent application of material to the reverse by an injection method. WO 2004/076 155 and WO 2004/103 680 describe the corresponding procedure for two-component injection molding. The process is moreover described in more detail in the article by S. Amesöder in Kunststoffe vol. 93, No. 9 (2003), pages 124-129 entitled "Plasma sorgt für festen Verbund" [Plasma provides firm bond].

After the plasma treatment, a molding-on process is used to produce the composite by means of application of material by an injection method, or of application of material to the reverse by an injection, foaming, or compression-molding method, or of application of material by extrusion, or of hot press molding, or of welding, or of coating and the like. Specifically in the case of radiation welding, prior use of absorbent additives can produce a bond at relatively low process pressures, e.g. by means of IR welding or laser welding. In laser transmission welding, radiation passes through either component a) or component b), and incipient melting of the absorbent layer takes place.

One application sector for the inventive composite parts is provided by way of example by elements of a system that conveys engine fuel, that conveys coolant fluid, or that conveys oil, e.g. in an automobile, for example attachments. Hitherto these attachments were produced by producing an interlock or by using an adhesion promoter (DE 42 39 909 C1; EP 1 241 229 A1; EP 0 836 044 A1; EP 1 323 973 A2; EP 1 403 030 A1, and DE 195 35 413 C1). The inventive process here gives composites in which the adhesion is not substantially impaired even on longlasting contact with engine fuel, with alcohols, with oils, or with greases and the like.

By way of example, it is possible to obtain connector pieces or connector elements which by way of example are produced by the two-component injection-molding process, using an Openair plasma and which are comprising PA12 regions and of polyethylene regions. The polyethylene regions can then be bonded by means of conventional welding methods to tanks (e.g. plastics fuel tanks), or to other containers or line components, e.g. of an engine-fuel system. Another particular inventive embodiment is the subsequent bonding of a region comprising a higher polyamide within a molding to, by way of example, a polyethylene region, for example of an engine-fuel system, where the bonding surface, preferably of the polyethylene component, is pre-activated by means of Openair plasma.

In the same way it is possible for extruded profile ends or extruded pipe ends by way of example to be activated by means of plasma and to be bonded to the other component by means of injection molding processes or other molding processes (compression molding, foaming, casting, sintering, etc.), or by means of a welding process. Similarly, it is possible for the outer surface of an extruded pipe comprising a higher polyamide to be activated, whereupon the pipe is sheathed by means of a crosshead with a thermoplastic elastomer or with a compounded rubber material. In the latter case this can be followed by vulcanization.

Bonding to PA6 or PA66 is specifically of interest by way of example for cooling system components. Coupling can be achieved by the welding process by way of the abovementioned two-component bonding elements (e.g. PA12/PA6); however, complete modules can similarly be produced by way of example from compounded materials using PA12 and, respectively, PA612, PA PACM12, PA6,3T, and PA6 or PA66. In a simple example, a PA6 connector region is injected onto the outer layer of a plasma-pretreated PA12 line. In principle, this method can be used to produce bonds of, by way of example, PA11 lines, PA12 lines, or PA612 lines to PA6 components or PA66 components, for example in an automobile.

Another application sector is provided by sheet-like composites in which a film or some other semifinished product comprising a higher polyamide, e.g. PA12, is plasma-treated and another material, such as PA6 or PA66, is applied to its reverse by an injection, e.g. for engine compartment covers. Other application sectors are provided by films (single- or multilayer films) which have to comply with specific surface requirements. Mention may be made here inter alia of decorative films with specific requirements relating to color, gloss, scratch resistance, or surface effects for use as protective covering, paneling, or a housing part in an automobile interior, or as an external part. When the backmolding process is applied to inserted films, these are generally, if appropriate, preformed by appropriate forming processes, such as thermoforming or high-pressure forming.

Another possibility not only in the case of film parts but also in the case of the other multicomponent parts is composite component parts with integrated electrical, magnetic, or optical functions, in which regions of the molding have been equipped with appropriate fillers or additives to achieve these local functions in the composite component part.

In principle, in the production of the inventive composite it is possible to use the Openair plasma either to treat that surface of the part a) which is to be bonded or to treat that surface of the part b) which is to be bonded, or to treat both. It is relatively easy to discover which of the alternatives is more suitable in each case. When PA12 or PA612 is used in combination with polyethylene, activation of the polyethylene component is currently thought to be preferable; activation of the PA12 or PA612 and subsequent application of polyethylene melt by an injection however leads to markedly lower adhesion.

Another possibility for production of composite parts with a component comprising a higher polyamide is activation of an adherent intermediate layer. A particular case is the use of a functionalized polyolefin, for example of a maleic-anhydride-grafted polypropylene (PPMA, e.g. ADMER® QB 551A), which, like pure PA12, has no, or very poor, adhesion to ABS-based molding compositions. Astoundingly, a firm PA12/PPMA/ABS bond can be achieved by activating the PPMA surface, for example of a multilayer film, with subsequent reverse application of an ABS melt, ABS/PC melt, PC/polybutylene terephthalate (PBT) melt, or PBT/PET melt, for example by the injection-molding process.

The inventive composite part can also comprise, besides the components a) and b), other components, e.g. a welded-on fuel tank, a coolant container, or a container for cleaning composition, or components of appropriate line systems, or other fastening elements or other mounting elements. Equally, it can comprise more than one component a) and/or more than one component b). The only decisive factor is that during the production process at least one bonding surface has been treated with an Openair plasma and has been thus activated.

German patent application 10 2005 004 280.5 filed Jan. 28, 2005, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for production of a composite part, comprising:
   treating at least one of components a) and b) of the composite part by a plasma process on a contact surface between the components a) and b) prior to production of the composite, followed by molding-on of the other component;
   wherein:
   component a) is a part comprising a molding composition comprising at least 40% by weight of a polyamide whose monomer units contain an average of at least 8 carbon atoms;
   component b) is a part comprising another molding composition; and
   in the plasma process, a plasma is generated inside of a plasma chamber and then carried out of the plasma chamber and on to the contact surface.

2. The process as claimed in claim 1, wherein the polyamide of component a) is selected from the group consisting of PA6,10, PA6,12, PA6,13, PA6,3T, PA8,10, PA8,12, PA10,10, PA10,10, PA11, PA12, PA12,12, PA PACM12 and combinations thereof.

3. The process as claimed in claim 1, wherein component a) comprises an additional layer which is adhesive-bonded to the molding composition based on polyamide.

4. The process as claimed in claim 1, wherein component b) comprises a molding composition based on a polymer which is selected from the group consisting of PA6, PA6,6, PA6/6T, polyolefins, polyoxymethylene, ABS, polycarbonate, polyester, PMMA, PPS, thermoplastic elastomer, and mixtures thereof.

5. The process as claimed in claim 1, wherein component b) comprises a compounded rubber material which is optionally vulcanized.

6. The process according to claim 5, wherein the rubber material is vulcanized.

7. The process according to claim 5, wherein the rubber material comprises a rubber selected from the group consisting of an EP(D)M rubber, an SB rubber, BR, NR, IR, IIR, CIIR, BIIR, NBR, CR, FPM, ACM, AEM or AECM, a styrene-containing block copolymer, a polyalkenylene and mixtures thereof.

8. The process according to claim 5, wherein the compounded rubber material comprises from 0 to 300 parts by weight of fillers, from 1 to 10 parts by weight of vulcanizing agents, from 0 to 4 parts by weight of vulcanization activators, and from 0 to 200 parts by weight of plasticizers, based on 100 parts by weight of rubber.

9. A composite part produced by the process as claimed in claim 1.

10. The composite part as claimed in claim 9, which is an element of a system that conveys engine fuel, that conveys coolant fluid, or that conveys oil.

11. The composite part as claimed in claim 9, wherein:
    the composite is in the form of a sheet; and
    component a) is in the form of a film.

12. The process according to claim 1, wherein each of components a) and b) is selected from the group consisting of moldings, single layer films, multilayer films and textile structures.

13. The process according to claim 1, wherein the polyamide of component a) is selected from the group consisting of polyetheresteramides, polyetheramides, copolyamides of polyetheresteramides, copolyamides of polyetheramides, and combinations thereof.

14. The process according to claim 1, wherein component b) comprises a molding composition based on a thermoplastic polymer.

15. A composite part, comprising:
    a) a part comprising a molding composition comprising at least 40% by weight of a polyamide whose monomer units contain an average of at least 8 carbon atoms, and
    b) a part comprising another molding composition;
    wherein at least one surface between parts a) and/or b) is activated by a plasma process in which a plasma is generated inside of a plasma chamber and then carried out of the plasma chamber and on to the at least one surface.

16. The composite part as claimed in claim 15, wherein the polyamide of part a) is selected from the group consisting of PA6,10, PA6,12, PA6,13, PA6,3T, PA8,10, PA8,12, PA10,10, PA10,12, PA11, PA12, PA12,12, PA PACM12 and combinations thereof.

17. The composite part as claimed in claim 15, wherein part a) comprises an additional layer which is adhesive-bonded to the molding composition based on polyamide.

18. The composite part as claimed in claim 15, wherein part b) comprises a molding composition based on a polymer which is selected from the group consisting of PA6, PA6,6, PA6/6T, polyolefins, polyoxymethylene, ABS, polycarbonate, polyester, PMMA, PPS, thermoplastic elastomer, and mixtures thereof.

19. The composite part as claimed in claim 15, wherein part b) comprises a compounded rubber material which is optionally vulcanized.

20. The composite part as claimed in claim 15, wherein each of components a) and b) is selected from the group consisting of moldings, single layer films, multilayer films and textile structures.

* * * * *